Patented Feb. 21, 1928.

1,659,998

UNITED STATES PATENT OFFICE.

EDWARD H. KEISER, OF CLAYTON, MISSOURI, ASSIGNOR TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing. Application filed September 16, 1926. Serial No. 135,996.

This invention relates to the treatment of emulsions of mineral oil and water, such as petroleum emulsions, for the purpose of separating the oil from the water.

Petroleum emulsions are of the water-in-oil type and comprise fine droplets of natural occurring waters or brines dispersed in a more or less permanent state throughout the oil which constitutes the continuous phase of the emulsion. They are obtained from producing wells and from the bottoms of oil storage tanks and are commonly referred to as "cut oil", "roily oil", "emulsified oil" and "bottom settlings".

One process that has heretofore been used extensively for breaking such petroleum emulsions contemplates subjecting the emulsion to the action of a treating agent consisting of or containing a modified fatty acid, as disclosed in U. S. patent to William S. Barnickel, No. 1,467,831, dated September 11, 1923.

I have devised a new process for breaking or separating such petroleum emulsions that is similar to the process described in the said Barnickel patent, in that the treating agent which is used contains a modified fatty acid, but which is distinguished from the said Barnickel process by the use of a treating agent composed of a combination of fatty constituents, preferably in a partially saponified condition, derived from an oleic acid-containing body treated in such a manner that the fatty acid contains a substantial quantity of sulpho-oleic acid.

In manufacturing or producing the treating agent contemplated by my process I prefer to first sulphonate commercial red oil by the procedure employed in preparing candle material or turkey red oil substitutes, i. e., by subjecting a suitable fatty material to treatment with sulphuric acid, and subsequently washing the same. I then analyze said material in the usual manner to determine the amount of oleic acid, stearolactone, hydroxystearic acid, etc. In some instances the said material will contain sulpholeic acid, and in other instances no sulpholeic acid will be present, depending upon the size of the batch, the ratio of oleic acid to sulphuric, the time of contact and the method used to wash the material.

I then make up a separate batch of material by sulphonating olive oil by means of sulphuric acid, as is customary in the production of turkey red oil from olive oil, and subsequently analyze said material to determine the sulpho-oleic acid content of same. Thereafter, I mix the said two batches in a certain ratio, and subsequently I partially saponify said mixture by adding approximately 8% of strong ammonia to same. The ratio in which said batches are combined may be varied slightly, but I prefer to combine said batches in such a way that the resulting compound is composed of the following ingredients mixed in approximately the proportions specified:

| | Per cent. |
|---|---|
| Stearolactone | 15 to 25 |
| Sulpholeic acid | 15 to 23 |
| Oleic acid | 32 to 42 |
| Hydroxystearic | 16 to 9 |
| Stearic acid | 6 to 1 |
| Non-saponifiable | 5 to 0 |
| Hydrocarbons, glycerine, etc. | 6 to 0 |
| Water | 5 to 0 |

While I prefer to use the procedure above described in producing the compound or treating agent used in my process, said compound can be obtained by the sulphonation of a mixture of olive oil and red oil, or it can be obtained from a synthetic oleic glyceride and red oil, or even from red oil alone.

The compound above referred to is soluble in water and is exceptionally efficient for treating many kinds of petroleum emulsions, as it contains a substantial amount of soluble sulpholeate. It also contains unchanged oleate or isoleate, hydroxystearates and stearates. These fatty acids are neutralized by either ammonia, soda, or potash sufficiently to represent about 40% saponification. When ammonia is used this would be equivalent to about 2% of ammonia. There are, of course, small amounts of impurities present, such as hydrocarbons, sulfates, water and glycerine.

The above described material can be used alone or in combination with a soluble hydrate, with ammonium hydrate or with ammonium hydrate and a suitable solvent.

In practising my process the treating agent or compound above described is brought in contact with an emulsion either by introducing the treating agent into a well in which the petroleum emulsion is being produced; introducing the treating agent into a conduit through which a petroleum emulsion is flowing; introducing the treating agent into a tank in which a petroleum emulsion is stored, or introducing the treating agent into a container that holds sludge obtained from the bottom of an oil storage tank. The treating agent can even be introduced into a producing well in such a way that it can become mixed with water or oil that is emerging from the ground before said water and oil enter the barrel of the well pump or the tubing up through which said water and oil flow to the surface of the ground. After any of the various treatments above referred to the emulsion is allowed to stand in a quiescent state at a suitable temperature so as to permit the water or brine to separate from the oil, or it may be passed through a variety of apparatus, such as hay tanks, gun barrels, etc. such as are now commonly used for "breaking" petroleum emulsions. It may even be passed through a heating apparatus, a centrifugal or an electrical dehydrator, or an emulsifying device, with or without the addition of water to the emulsion, or it may be subjected to action by a combination of two or more of the devices above referred to.

Having thus described my invention, what I claim as new and desire to secure by Letters Patent is:

1. A process for breaking or separating petroleum emulsions, characterized by subjecting the emulsion to the action of a treating agent composed of a substantial quantity of sulpho-oleic acid and approximately 80% of oleic acid bodies.

2. A process for breaking or separating petroleum emulsions, characterized by subjecting the emulsion to the action of a treating agent composed of a substantial quantity of sulpho-oleic acid, approximately 35% of oleic acid and approximately 45% of oleic acid derivatives.

3. A process for breaking or separating petroleum emulsions, characterized by subjecting the emulsion to the action of a treating agent containing 15% to 25% of stearolactone, approximately 15% to 23% of sulpho-oleic acid, approximately 32% to 42% oleic acid, and approximately 16% to 9% of hydroxystearic, approximately 6% to 1% of stearic acid, and approximately 16% to 0% of non-fatty material.

4. A process for breaking or separating petroleum emulsions, characterized by subjecting the emulsion to the action of a treating agent composed of the following ingredients mixed in approximately the proportions specified:

| | Per cent |
|---|---|
| Stearolactone | 15 to 25 |
| Sulpholeic acid | 15 to 23 |
| Oleic acid | 32 to 42 |
| Hydroxystearic | 16 to 9 |
| Stearic acid | 6 to 1 |
| Non-saponifiable | 5 to 0 |
| Hydrocarbons, glycerine, etc. | 6 to 0 |
| Water | 5 to 0 |

EDWARD H. KEISER.